M. B. SOUTHWICK.
Drying Apparatus.
No. 14,297.
2 Sheets—Sheet 1.
Patented Feb. 19, 1856.
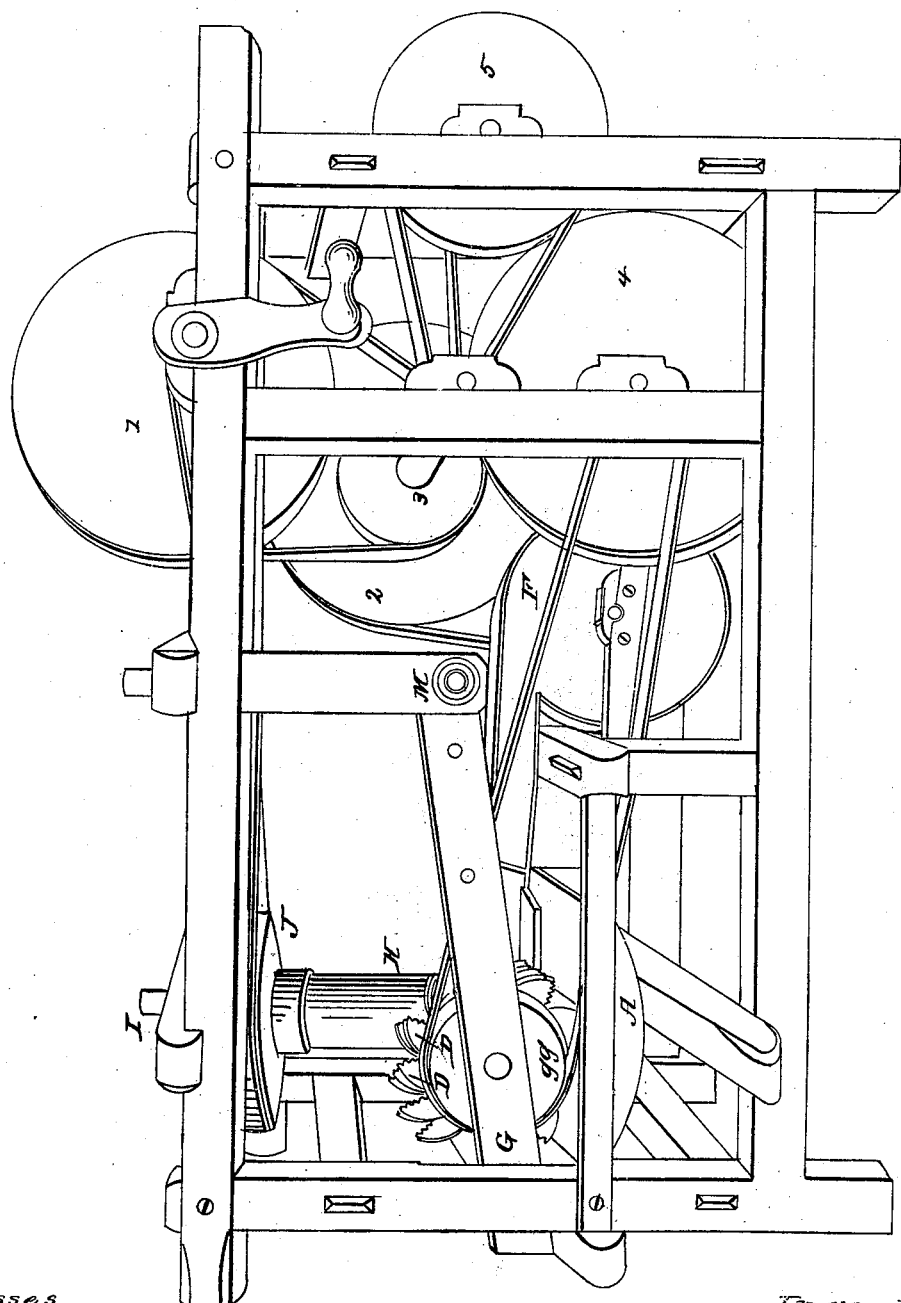

M. B. SOUTHWICK.
Drying Apparatus.
No. 14,297.
2 Sheets—Sheet 2.
Patented Feb. 19, 1856.
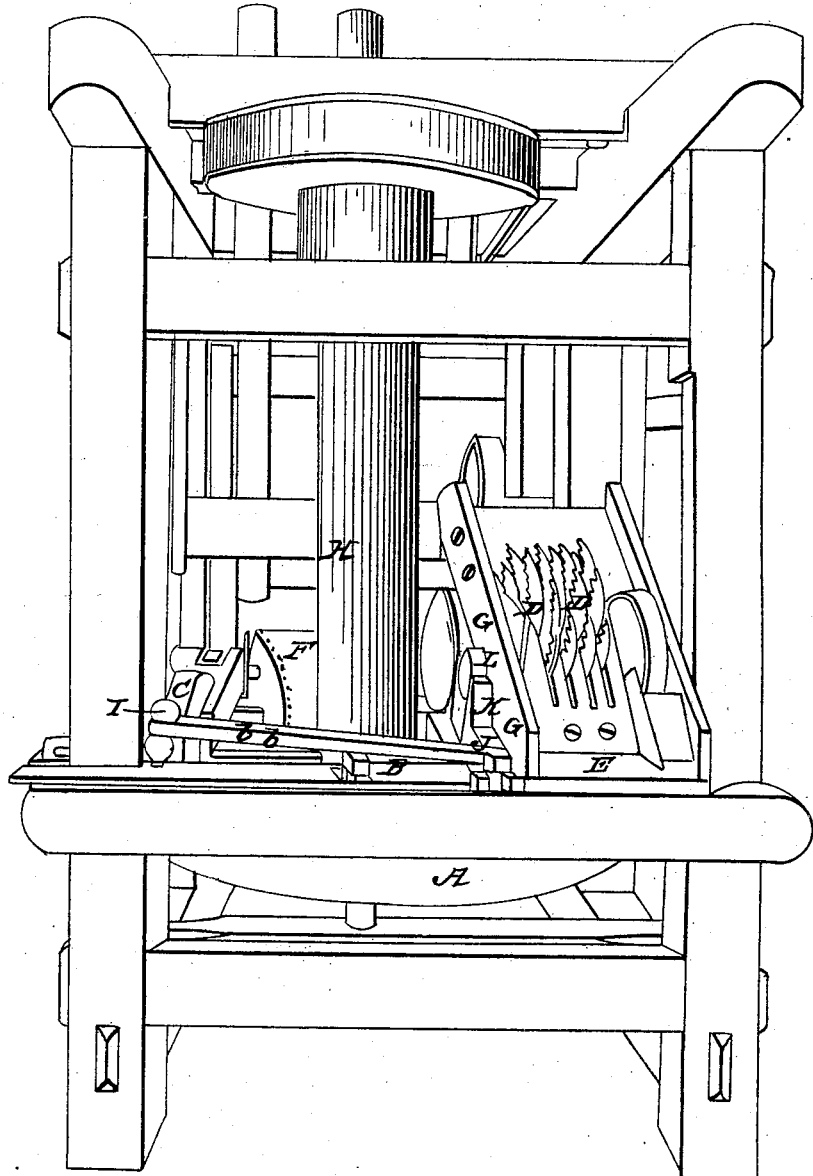

UNITED STATES PATENT OFFICE.

MASA BRANCH SOUTHWICK, OF ST. HILAIRE, CANADA EAST.

MACHINE FOR PREPARING VEGETABLES FOR PRESERVATION.

Specification forming part of Letters Patent No. 14,297, dated February 19, 1856; Reissued August 30, 1864, No. 1,753.

*To all whom it may concern:*

Be it known that I, MASA BRANCH SOUTH-WICK, residing in the parish of St. Hilaire, district of Montreal, Canada East, do declare that the following is a true, full, and correct specification and description of the invention of certain apparatus for and the method of crushing, skinning, drying, and otherwise preparing potatoes and other roots and vegetables, as well as fruits and meats, and for which I have, by my petition bearing equal date with these presents, sought to obtain Her Majesty's Letters Patent for the Province of Canada, for potatoes, roots, or other vegetables.

I cook them by boiling, steaming, or by the application of heated air. When sufficiently cooked I remove the external humidity by a current of hot air driven through them.

To enable others skilled in the art to make and use my invention, I will proceed to describe its construction and operation.

I construct a frame of posts and timbers of any desirable form, into and connected with which, I place the machinery by me invented or combined for the purposes aforesaid. The pulleys upon shafts, represented in drawing No. 1, and numbered 1, 2, 3, 4 and 5, respectively, are introduced as a convenient combination of gearing, for a working model, by which my invention and improvement may be operated and the principles of it exhibited.

I construct a circular trough, or table with borders or curbs on the outside and inside thereof, as shown at A, in Figures 1 and 2, in which said vegetables are to be crushed, dried and prepared. A perpendicular, or vertical shaft, marked H, in Figs. 1 and 2, passes through said trough, or table, into a box in a timber underneath said trough, and the upper end of said shaft runs in a box placed in a cross timber over the top of the frame, as shown at point marked I, in Fig. No. 1. Near the upper end of and upon said shaft, marked H, a pulley is placed as shown at point J, in Fig. 1, upon which a band runs, and, with the motive power applied turns the shaft and circular trough around. I place a roller, as shown at point C, in Fig. 2, in said trough or table, which is permanently attached to said frame, in the manner shown in Fig. 2, or may be attached in any other convenient manner. Scrapers are attached to each side of said roller, which descend into the trough and when the trough is in motion, these scrapers gather together and return the substances in process of being crushed, under said roller. The turning or revolving of said trough or table, causes the roller, which rests on the inner surface of the bottom of said trough or table, to revolve in an opposite direction, and thus crushes the substances beneath it. I construct a cylinder and attach it to framework, shown in Figs. 1 and 2, and marked G, at one end of which cylinder is a pulley block attached to a shaft which passes through the cylinder, as shown at point *g*, *g*, in Figs. 1 and 2, upon which pulley or band runs to operate the cylinder, as shown in Fig. 1. Upon this cylinder I attach plates of metal or other material of aquiline or any other desirable shape or form, with denticulated or serrated edges therein, as shown at points marked D, D, in Figs. No. 1 and 2, which cylinder and apparatus thereon I call a doffer, which doffer is suspended over said trough or table, by having a shaft pass through the upper end of said frame marked G and into timbers as shown at point marked M, in drawing or Fig. No. 1. The other end of the frame is not permanently attached to any timber, but may be raised or lowered as may be necessary, in operating the machine. After the substances, having skins or peels, are sufficiently crushed, the motive power is applied to the doffer and it is moved about one eighth as fast as the trough or table moves, and while the doffer is thus in motion the said plates pass continually through the pulp, and the skins or peels are taken up by the serrated or denticulated edges thereof and are discharged upon an apron or stage, represented in Fig. 2, at point marked E. A rack is attached above said apron, as shown at point *e*, *e*, in Fig. No. 2, so fitted that in the revolution of said cylinder, the said plates pass through said rack, and are thereby cleansed of the skins and peels, which are thrown off upon said apron. A rake is attached to said apparatus, the head of which is represented in Fig. 2, at point marked B, the teeth of which extend down into said trough, which head is attached to a handle or piece of timber, marked *b*, *b*, in Fig. 2; one end of which handle or timber is confined by a pin as shown at point marked I, and the other end of which is made permanent in a notch or mortise in another timber, marked K, at point J, in said Fig. 2. Said timber, marked K, is connected with a pulley, running on an eccentric, attached to said cylinder, at point marked L, in said Fig. 2, which eccentric motion given to said rake keeps the substances being crushed or dried in said trough or table in continual motion, and thereby loosens the mass of the pulp so that the skins and peels are easily taken up on the teeth of the plates.

For the purpose of introducing and using hot air, in the drying process, I construct an ordinary fan bellows, as shown in Fig. 1, at point marked F, by means of which the hot air is forced, in jets, through tubes, or holes in a plate, attached to the conductor of the hot air from the bellows into the pulp in the trough or table marked A, and while said drying process is going on, the trough or table should be so covered as to exclude, as much as possible, the cold air therefrom.

In using my said invention and improvement for drying fruits I place such fruits as do not require the skin to be taken off, or the cores or kernels to be removed, in the trough or table, marked A, and proceed in the same manner as in drying potatoes, but applying a more moderate heat, and using the rake B, in Fig. 2, to turn the fruit and keep it in motion while the drying process is going on. Other fruits may be pared and cut in pieces, or cut in pieces without paring, and dried by the process last described.

Before proceeding to dry meats, I first cut them into pieces of convenient size for boiling and then put them into boiling water and keep them boiling a sufficient time to coagulate the albumen, whereby the other nutritious qualities of the meats are more perfectly preserved. I then cut them into small shreds, pieces or particles, and dry them in the manner above described.

What I claim as my invention and desire to secure by Letters Patent is—

The improved mode, above described, of separating the skins or peels of potatoes and other vegetables from the pulp, by driving the pulp and skins together against the denticulated or serrated edge or edges of pieces of metal or other material, whether such pieces be aquiline shaped or otherwise, provided the skins are caught by the teeth and are thereby separated and taken from the pulp, whether the teeth be shaped like saw teeth or otherwise, or whether the working table be of circular form and revolving, or be made of any other shape and caused to vibrate or move from side to side to produce the effect of the circular trough or table above described.

In witness whereof I have signed these presents and the accompanying drawings Figs. 1 and 2 before the undersigned subscribing witnesses at the city of Quebec this fifteenth day of September in the year of our Lord one thousand eight hundred and fifty three.

MASA BRANCH SOUTHWICK.

Witnesses:
  WM. GUBBEN,
  J. B. FUTROYE.

[FIRST PRINTED 1912.]